US008169940B2

(12) United States Patent
Park et al.

(10) Patent No.: US 8,169,940 B2
(45) Date of Patent: May 1, 2012

(54) TECHNIQUES FOR DEVICE AND PICONET CONTROLLER AVAILABILITY NOTIFICATION IN WIRELESS PERSONAL AREA AND WIRELESS LOCAL AREA NETWORKS

(75) Inventors: Minyoung Park, Portland, OR (US); Carlos Cordeiro, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 713 days.

(21) Appl. No.: 12/290,967

(22) Filed: Nov. 4, 2008

(65) Prior Publication Data

US 2010/0110951 A1 May 6, 2010

(51) Int. Cl.
*G08C 17/00* (2006.01)
*H04J 3/00* (2006.01)

(52) U.S. Cl. ........................................ 370/311; 370/336

(58) Field of Classification Search .................. 370/331, 370/311

See application file for complete search history.

(56) References Cited

U.S. PATENT DOCUMENTS

| | | | | |
|---|---|---|---|---|
| 7,567,820 | B2 * | 7/2009 | Bitran et al. | 455/552.1 |
| 2005/0083896 | A1 * | 4/2005 | Hong et al. | 370/338 |
| 2005/0094657 | A1 * | 5/2005 | Sung et al. | 370/431 |
| 2005/0164642 | A1 * | 7/2005 | Roberts | 455/67.13 |
| 2007/0159992 | A1 * | 7/2007 | Kim | 370/311 |
| 2007/0183383 | A1 * | 8/2007 | Bitran et al. | 370/338 |
| 2008/0013522 | A1 * | 1/2008 | Benveniste | 370/350 |
| 2009/0010210 | A1 * | 1/2009 | Hiertz et al. | 370/329 |
| 2009/0262710 | A1 * | 10/2009 | Doi et al. | 370/336 |

* cited by examiner

*Primary Examiner* — Jeffrey Pwu
*Assistant Examiner* — Gerald Smarth
(74) *Attorney, Agent, or Firm* — Prass LLP; Ellis B. Ramirez

(57) ABSTRACT

An embodiment of the present invention provides a method, comprising notifying of device and piconet controller (PNC) availability in wireless personal area network (WPAN) and/or wireless local area networks (WLAN) at the start of a superframe, wherein whether the PNC will stay awake or go to sleep during a part of the superframe depends on whether or not there are any services to provide in the WPAN and/or WLAN during a given period of time, and wherein the PNC shall stay awake if there are services to provide in the WPAN and/or WLAN to maintain network performance, otherwise the PNC will go to sleep to minimize its energy consumption.

21 Claims, 3 Drawing Sheets

200

CTA INFORMATION ELEMENT

| BITS: 3 | 1 | 1 | 1 | 1 | 1 | 1 |
|---|---|---|---|---|---|---|
| USER PRIORITY | PM CTRq TYPE | CTA TYPE | CTA RATE TYPE | TARGET ID LIST TYPE | TRUNCATABLE | EXTENSIBLE | RESERVED |

100

CHANNEL TIME REQUEST (CTRq) FRAME FORMAT

| OCTETS: 1 | 1 | 8 | 8 | ... | 8 |
|---|---|---|---|---|---|
| ELEMENT ID | LENGTH | CTA BLOCK 1 | CTA BLOCK 2 | ... | CTA BLOCK N |

| OCTETS: 1 | 1 | 1 | 2 | 2 | 1 |
|---|---|---|---|---|---|
| SRCID | DESTID | STREAM INDEX | CTA LOCATION | CTA DURATION | CTA CONTROL |

| BITS: 1 | 1 | 6 |
|---|---|---|
| TRUNCATABLE | EXTENSIBLE | RESERVED |

200

CTA INFORMATION ELEMENT

300

| OCTETS: 1 | 1 | 1 |
|---|---|---|
| ELEMENT ID | LENGTH | PNC AVAILABILITY INFORMATION |

PNC AVAILABILITY IE FORMAT

| BITS: 1 | 7 |
|---|---|
| CAP | RESERVED |

PNC AVAILABILITY INFORMATION FIELD FORMAT

| OCTETS: 1 | 1 | 1 |
|---|---|---|
| ELEMENT ID | LENGTH | DEV AVAILABILITY INFORMATION |

DEV AVAILABILITY IE FORMAT

| BITS: 1 | 1 | 6 |
|---|---|---|
| CAP | DYNAMIC BANDWIDTH REQUEST | RESERVED |

DEV AVAILABILITY INFORMATION FIELD FORMAT

| OCTETS: 1 | 1 | 1 | 1 |
|---|---|---|---|
| ELEMENT ID | LENGTH | DEV AVAILABILITY INFORMATION | SUPERFRAME INDEX |

DEV AVAILABILITY IE FORMAT

*FIG. 7*

TECHNIQUES FOR DEVICE AND PICONET CONTROLLER AVAILABILITY NOTIFICATION IN WIRELESS PERSONAL AREA AND WIRELESS LOCAL AREA NETWORKS

BACKGROUND

Most TDMA based wireless personal area network (WPAN) or wireless local area network (WLAN) technologies divide a fixed time period into contention free periods and contention periods. For example, in the Institute for Electrical and Electronic Engineers (IEEE) 802.15.3c standard, the fixed time period is called superframe (SF), the contention free period is called CTA (channel time allocation) period, and the contention period is called CAP (contention access period). CTAs are scheduled by a central controller called a PNC (piconet controller) and a CTA is exclusively allocated to a pair of devices. CAP periods are also allocated by the PNC, but the difference from the CTA is that any device can access the medium during CAP periods by contending with each other (e.g., through CSMA/CA). A PNC may be also known as an Access Point (AP) and SF may be also known as Beacon Interval (BI) in the IEEE 802.11 standard. Similarly, CAP may be also known as Contention-Based Period (CBP) and CTA may be also known as Service Period (SP).

Since a CTA is allocated exclusively to a subset of devices in the network, other devices not involved in the communications in that CTA can go to sleep to minimize their energy consumption. However, during CAPs, all the active devices (i.e., the devices which are not in a sleep state) in the network are required to stay awake and cannot go to sleep because any device may try to communicate with any other device, including the PNC, during the CAPs. Therefore, active devices and PNC cannot save power during CAPs.

A similar problem is also present in two other mechanisms. The first is related to CTA truncation and extension. The CTA truncation is a mechanism that releases an unused CTA time period and the CTA extension is a mechanism that extends CTA time if additional time is needed. Since a device that wants to truncate or to extend CTA needs to inform or request to the PNC, the availability of the PNC has to inform the devices. Otherwise, the devices may transmit a CTA truncation or extension messages to the PNC without knowing that the PNC is unavailable.

The second is during the polling period for the dynamic bandwidth allocation mechanism. During the polling period of the dynamic bandwidth allocation, the PNC polls associated devices during unused channel time of a superframe to obtain bandwidth requests from the devices for the purpose of dynamic allocation of the unused channel time. For this period, the PNC needs information whether the devices will be available or not (e.g., device may be in power saving mode). Otherwise, the PNC may transmit polling messages to the devices without knowing that the devices are not available.

Thus, a strong need exists for techniques for device and piconet controller availability notification in wireless personal area and wireless local area networks.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 3 illustrates a PNC availability IE format according to one embodiment of the present invention;

FIG. 4 illustrates a PNC availability information field format according to one embodiment of the present invention.

FIG. 5 illustrates a DEV Availability IE format according to one embodiment of the present invention;

FIG. 6 illustrates a DEV availability information field format according to one embodiment of the present invention; and FIG. 7 illustrates a DEV Availability IE format according to one embodiment of the present invention.

Figure 1:
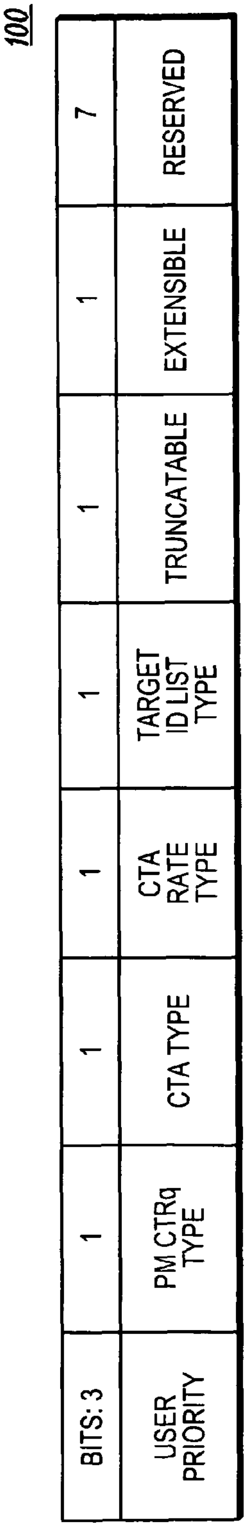
FIG. 1 illustrates a Channel Time Request (CTRq) frame format according to one embodiment of the present invention.

It will be appreciated that for simplicity and clarity of illustration, elements illustrated in the figures have not necessarily been drawn to scale. For example, the dimensions of some of the elements are exaggerated relative to other elements for clarity. Further, where considered appropriate, reference numerals have been repeated among the figures to indicate corresponding or analogous elements.

DETAILED DESCRIPTION

In the following detailed description, numerous specific details are set forth in order to provide a thorough understanding of the invention. However, it will be understood by those skilled in the art that the preset invention may be practiced without these specific details. In other instances, well-known methods, procedures, components and circuits have not been described in detail so as not to obscure the present invention.

Although embodiments of the invention are not limited in this regard, discussions utilizing terms such as, for example, “processing,” “computing,” “calculating,” “determining,” “establishing”, “analyzing”, “checking”, or the like, may refer to operation(s) and/or process(es) of a computer, a computing platform, a computing system, or other electronic computing device, that manipulate and/or transform data represented as physical (e.g., electronic) quantities within the computer’s registers and/or memories into other data similarly represented as physical quantities within the computer’s registers and/or memories or other information storage medium that may store instructions to perform operations and/or processes.

Although embodiments of the invention are not limited in this regard, the terms “plurality” and “a plurality” as used herein may include, for example, “multiple” or “two or more”. The terms “plurality” or “a plurality” may be used throughout the specification to describe two or more components, devices, elements, units, parameters, or the like. For example, “a plurality of stations” may include two or more stations.

Embodiments of the present invention provide mechanisms and techniques that may provide information whether devices and a PNC will be active during the following periods:

1) CAP;

2) Dynamic bandwidth allocation; and

3) CTA truncation or extension period.

In an embodiment of the present invention, this information may be provided on a superframe basis so that the PNC or the devices can go to sleep during these periods without performance degradation.

Further, embodiments of the present invention provide a mechanism that enables a PNC to inform the availability of the PNC to associated devices in the network at the start of a superframe. Whether the PNC will stay awake or go to sleep during a part of a superframe depends on whether there are any services to provide in the network or not during that period of time. The PNC shall stay awake if there are services to provide in the network to maintain the network performance; otherwise the PNC will go to sleep to minimize its energy consumption.

The information concerning whether the PNC has to be involved in the communications between the devices during a specific superframe may be provided by the devices in the network. For example, if a device wants to communicate with the PNC during a CAP, the device may inform the PNC that during the CAP it will try to communicate with the PNC. With this information from the device, the PNC shall stay awake during the CAP; otherwise it may go to sleep.

This can also be applied to the mechanisms such as CTA truncation and extension in a very similar manner. Since the PNC has to be involved in the CTA truncation and extension, if the devices expect their CTAs to be truncated or extended, this information needs be delivered to the PNC when the devices are requesting a CTA allocation. If the device sends a CTA request (bandwidth allocation request) with an indication that it plans to truncate or extend its allocated CTA, the PNC shall stay awake during that CTA; otherwise, the PNC can go to sleep.

Turning now to FIG. 1, generally as 100, is an example of the CTA request frame format. As can be seen, a device would indicate to the PNC through the Truncatable and Extensible fields that it plans to truncate or extend this particular CTA. The PNC would then use this information to stay awake or go to sleep during this particular CTA.

Figure 2:
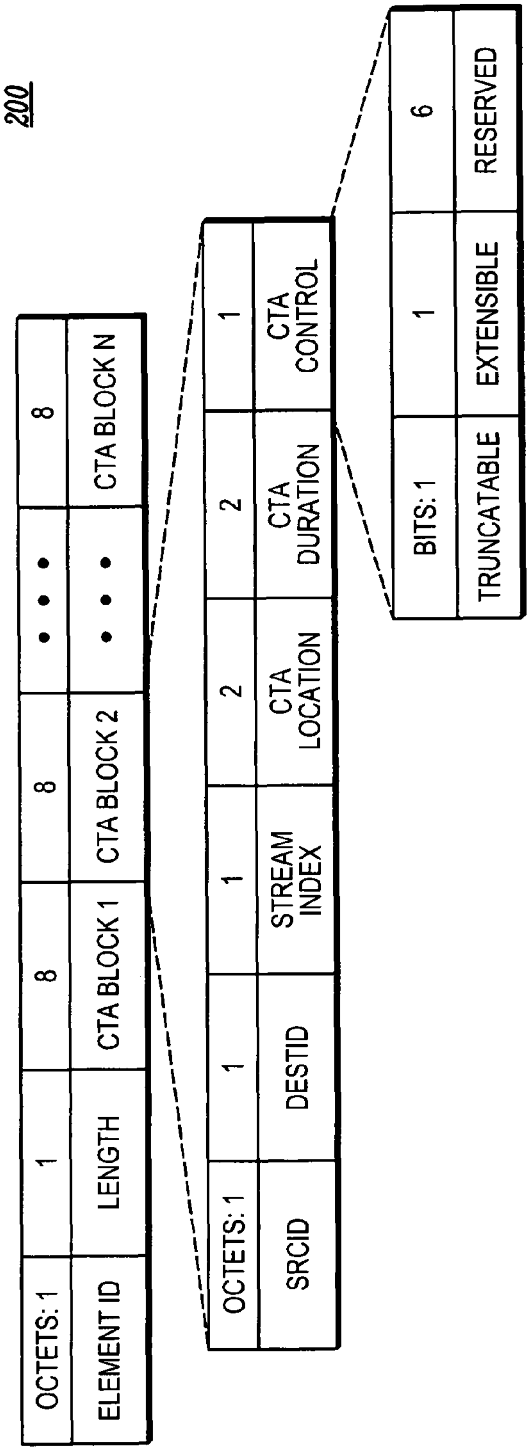
FIG. 2 illustrates a CTA information element according to one embodiment of the present invention.

After a CTA request, the PNC needs to update its scheduling information and broadcast it in its next superframe. The frame format used for this purpose is shown in FIG. 2 at 200. As can be seen, the PNC also includes in its schedule the information whether or not a given CTA is truncatable and/or extensible.

Once the information is provided by the devices to the PNC, the PNC provides the PNC availability information to the devices. For example, the PNC availability information can be delivered in an information element (IE) (e.g. "PNC Availability IE" (PAIE)) from the PNC to the devices. The availability of the PNC may be specified either for all the CAPs in the superframe or for each CAP separately. For CTAs, the PNC availability will be specified for each CTA implicitly by the CTA IE as shown in FIG. 2. If the PNC sets either Truncatable or Extensible bit (shown in FIG. 2) of a CTA block to 1, the PNC shall stay awake during that CTA period; otherwise the PNC may go to sleep during that period.

An example of PAIE frame format is shown in FIG. 3, generally as 300, and the PNC availability information field is shown in FIG. 4, generally as 400. If the PNC is available during the CAPs in the superframe, the CAP bit is set to 1; otherwise it is set to 0.

Some embodiments of the present invention also provide a mechanism that provides the availability information of the devices to the PNC so that the PNC knows which devices are available during the CAPs or the polling period of the dynamic bandwidth allocation mechanism.

Similar to PAIE (PNC Availability IE) provided above, further embodiments of the present invention provide device availability information that may be conveyed in an IE (e.g. "DEV Availability IE" (DAIE)) and delivered from the devices to the PNC. The availability of the devices may be specified either for all the CAPs in the superframe or for each CAP separately. The availability of the devices may be separately specified for the polling period of the dynamic bandwidth allocation. An example of DAIE frame format is shown in FIG. 5, generally as 500, and the DEV availability information field is shown in FIG. 6, generally as 600. If the DEV is available during the CAPs in the next superframe, the CAP bit is set to 1; otherwise it is set to 0. If the DEV is available for the polling, the dynamic bandwidth request bit is set to 1; otherwise it is set to 0.

We may also specify the index of the superframe in which a device will be available during the CAPs or for polling by adding another field indicating the index of the superframe as provided generally as 700 of FIG. 7.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

We claim:

1. A method, comprising:

notifying of device and piconet controller (PNC) availability in a network at the start of a superframe, wherein the network is at least one of wireless personal area network (WPN) or wireless local area networks (WLAN), wherein whether said PNC will stay awake or go to sleep during a part of said superframe depends on whether or not there are any services to provide in said network during a given period of time; and keeping said PNC awake when the PNC provides services to maintain network performance, otherwise said PNC will go to sleep to minimize its energy consumption, wherein said method is applied to channel time allocation (CTA) truncation and extension; wherein when said devices expect their CTAs to be truncated or extended, this information is delivered to said PNC when said devices are requesting a CTA allocation, and when said devices send CTA requests with an indication that they plan to truncate or extend their allocated CTAs, said PNC shall stay awake during those CTAs and otherwise, said PNC can go to sleep.

2. The method of claim 1, wherein information on whether said PNC has to be involved in communications between devices in said network during a specific superframe is provided by said devices in said network.

3. The method of claim 1, wherein after a CTA request, said PNC updates its scheduling information and transmits it in its next superframe, and wherein the frame format includes in its schedule the information on whether or not a given CTA is truncatable and/or extensible.

4. The method of claim 3, wherein once said truncatable and/or extensible information is provided by said devices to said PNC, said PNC provides said PNC availability information to said devices.

5. The method of claim 1, further comprising providing availability information of said devices to said PNC so that said PNC knows which devices are available during contention access periods (CAPs) or polling periods.

6. The method of claim 5, wherein device availability information is conveyed in an information element (IE) and delivered from said devices to said PNC and the availability of said devices is specified either for all said CAPs in said superframe or for each CAP separately.

7. The method of claim 5, further comprising specifying an index of said superframe in which a device will be available during CAPs or for polling by adding another field indicating the index of said superframe.

8. An apparatus, comprising:

at least one mobile device operable to communicate with a piconet controller (PNC) in a network, wherein the network is at least one of wireless personal area network (WPN) or wireless local area networks (WLAN) and wherein said at least one mobile device and said PNC are adapted to notify of device and piconet controller (PNC) availability in said network at the start of a superframe, wherein whether said PNC will stay awake or go to sleep during a part of said superframe depends on whether or not there are any services to provide in said network during a given period of time; and keeping said PNC awake when there are services to provide in said network to maintain network performance, otherwise said PNC will go to sleep to minimize its energy consumption; wherein said at least one device is adapted for channel time allocation (CTA) truncation and extension and operable to communicate such to said PNC; wherein when said at least one device expects its CTA to be truncated or extended, this information is delivered to said PNC when said at least one device is requesting a CTA allocation, and when said at least one device sends CTA requests with an indication that it plans to truncate or extend its allocated CTAs, said PNC shall stay awake during those CTAs and otherwise, said PNC can go to sleep.

9. The apparatus of claim 8, wherein information on whether said PNC has to be involved in communications between devices in said network during a specific superframe is provided by said devices in said network.

10. The apparatus of claim 8, wherein after a CTA request, said PNC updates its scheduling information and transmits it in its next superframe, and wherein the frame format includes in its schedule the information on whether or not a given CTA is truncatable and/or extensible.

11. The apparatus of claim 10, wherein once said truncatable and/or extensible information is provided by said at least one device to said PNC, said PNC provides said PNC availability information to said at least one device.

12. The apparatus of claim 8, wherein said at least one device further provides availability information of said at least one device to said PNC so that said PNC knows this devices availability during contention access periods (CAPs) or polling periods.

13. The apparatus of claim 12, wherein device availability information is conveyed in an information element (IE) and delivered from said at least one device to said PNC and the availability of said devices is specified either for all said CAPs in said superframe or for each CAP separately.

14. The apparatus of claim 12, further comprising specifying an index of said superframe in which said at least one device will be available during CAPs or for polling by adding another field indicating the index of said superframe.

15. A machine-accessible medium that provides instructions, which when accessed, cause a machine to perform operations comprising:

notifying of device and piconet controller (PNC) availability in a network local area networks (WLAN) at the start of a superframe, wherein the network is at least one of wireless personal area network (WPN) or wireless local area networks (WLAN), wherein whether said PNC will stay awake or go to sleep during a part of said superframe depends on whether or not there are any services to provide in said network during a given period of time; and keeping said PNC awake when there are services to provide in said network to maintain network performance, otherwise said PNC will go to sleep to minimize its energy consumption;

wherein said method is applied to channel time allocation (CTA) truncation and extension;

wherein when said devices expect their CTAs to be truncated or extended, this information is delivered to said PNC when said devices are requesting a CTA allocation, and when said devices send CTA requests with an indication that they plan to truncate or extend their allocated CTAs, said PNC shall stay awake during those CTAs and otherwise, said PNC can go to sleep.

16. The machine-accessible medium of claim 15, wherein information on whether said PNC has to be involved in communications between devices in said network during a specific superframe is provided by said devices in said network.

17. The machine-accessible medium of claim 15, wherein after a CTA request, said PNC updates its scheduling information and transmits it in its next superframe, and wherein the frame format includes in its schedule the information on whether or not a given CTA is truncatable and/or extensible.

18. The machine-accessible medium of claim 15, further comprising said instructions causing said machine to perform operations further comprising providing availability information of said devices to said PNC so that said PNC knows which devices are available during contention access periods (CAPs) or polling periods.

19. The machine-accessible medium of claim 18, wherein once said truncatable and/or extensible information is provided by said devices to said PNC, said PNC provides said PNC availability information to said devices.

20. The machine-accessible medium of claim 18, wherein device availability information is conveyed in an information element (IE) and delivered from said devices to said PNC and the availability of said devices is specified either for all said CAPs in said superframe or for each CAP separately.

21. The machine-accessible medium of claim 18, further comprising said instructions causing said machine to perform operations further comprising specifying an index of said superframe in which a device will be available during CAPs or for polling by adding another field indicating the index of said superframe.

* * * * *